Dec. 6, 1966           J. LOUDA           3,289,473
TENSION MEASURING APPARATUS
Filed July 14, 1964
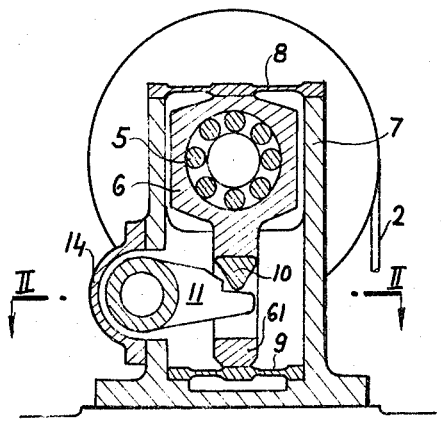
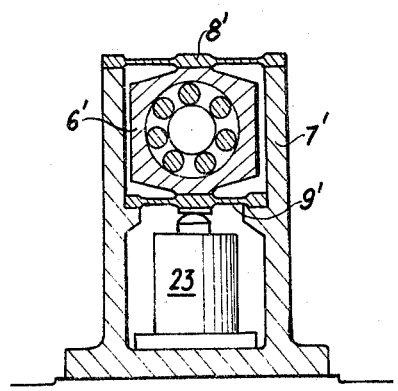
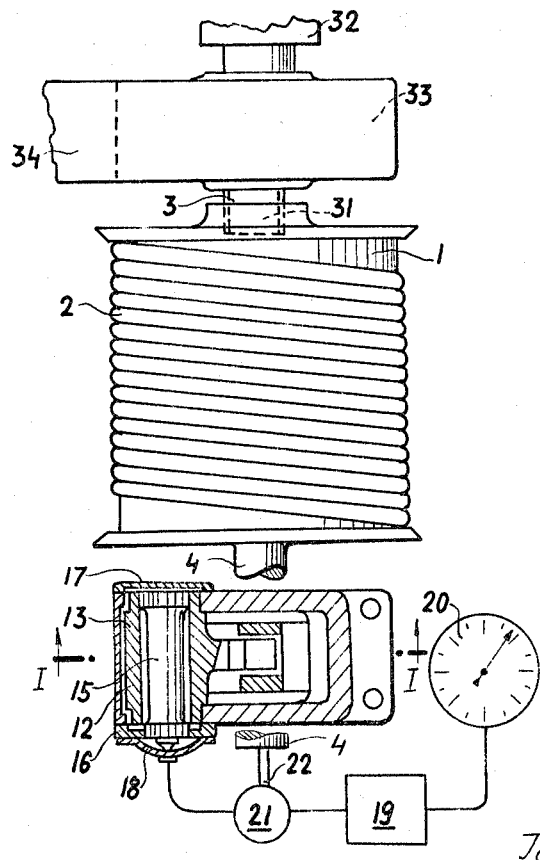
INVENTOR.
Jan Louda
BY Richard Low
Ag't

United States Patent Office 3,289,473
Patented Dec. 6, 1966

3,289,473
TENSION MEASURING APPARATUS
Jan Louda, Plzen, Czechoslovakia, assignor to Zavody V.I. Lenina Plzen, narodni podnik, Plzen, Czechoslovakia
Filed July 14, 1964, Ser. No. 382,541
8 Claims. (Cl. 73—143)

This invention relates to tension measuring apparatus, and particularly to apparatus for measuring the tension in a rope, cable, or similar tension member, whereby a load suspended from the tension member may be weighed.

It is known to provide hoists and similar load lifting devices with weighing attachments which provide an indication of the tension in the hoist cable from the reaction of the hoist drum to the cable tension.

The primary object of the invention is the provision of a tension measuring apparatus suitable for weighing a load supported from a tension member which is simple in its construction and has but very few and rugged movable elements.

Another object is the weighing of the load suspended from a hoist and the like by means of an apparatus which does not significantly increase the weight and bulk of the hoist beyond the weight and bulk of an otherwise comparable hoist not equipped for weighing.

With these and other objects in view, the invention in one of its aspects mainly resides in an apparatus for measuring tension in a tension member. The apparatus includes a drum on which the tension member may be wound in the usual manner. A drive mechanism arranged for rotation about a fixed axis pivotally engages one of the axial end portions of the drum so as to rotate the drum about its axis. The other axial end portion of the drum is supported in a bearing arrangement which mainly consists of a fixed support, a bearing member, and yieldably resilient means. The bearing member is rotatably engaged by the other axial end portion of the drum, and is movable on the fixed support in a direction transverse to the drum axis. The yieldably resilient means urge the bearing member toward a predetermined position on the support. The spacing of the bearing member from its predetermined position is measured as an indication of tension in a tension member partly wound on the drum, and supporting a load on its free portion.

The exact nature of this invention as well as other objects and advantages thereof will be readily apparent from consideration of the following specification relating to the annexed drawing in which:

FIG. 1 shows a tension measuring apparatus of the invention in elevational section of line I—I in FIG. 2;

FIG. 2 is a plan view of the apparatus of FIG. 1, portions of the apparatus being broken away and others shown in section on the line II—II, and diagrammatically illustrates the electrical indicating circuit which is a part of the apparatus; and FIG. 3 illustrates a modified measuring apparatus of the invention in a partial elevational view corresponding to FIG. 1.

Referring now to the drawing in detail, and initially to FIGS. 1 and 2, there is seen the drum 1 of a hoist on which a cable 2 is wound in a single, tight, helical layer. One end of the cable 2 is attached to the drum 1 near one axial end thereof in a conventional manner, not shown.

A drive shaft 3 is connected to one axial end of the drum 1 by a universal joint 31 in a manner similar to the wobbler and coupling box of a rolling mill, and not illustrated in detail. The drive shaft 3 is journaled in a fixed portion 32 of the hoist frame and carries a pulley 33. A flat belt 34 is trained over the pulley 33 and connects the same to a non-illustrated drive motor.

A trunnion 4 on the axial end of the drum 1 remote from the drive shaft 3 is journaled in a bearing block 6 by means of a roller bearing 5. The bearing block is attached to a guiding and supporting frame 7 by two wide leaf springs 8, 9 which permit, but resist movement of the trunnion 4 transverse to its axis, and tilting of that axis relative to the universal joint 31.

A vertical apertured plate 61 integral with the bearing block 6 extends downward from the same. An abutment 10 mounted in the aperture of the plate 61 engages the sensing arm 11 of a magnetostrictive transducer. The transducer is of a known type and has been illustrated only as far as is necessary for an understanding of this invention.

The transducer includes a sleeve 12 which is integral with the arm 11 and is supported in roller bearings 13 arranged between a portion of the frame 7 and a semi-cylindrical cover 14 which is flanged to the frame 7. A cylindrical torsion pin 15 of ferromagnetic material is coaxially arranged within the sleeve 12. One of its axial ends is fixedly fastened to the frame 7 by a flange 16, and the other end is fastened to the sleeve 12. The working elements of the transducer are protected by axial end plates 17, 18.

It will be understood that the transducer further includes a coil which magnetizes the pin 15 when energized, and a pick-up coil which produces an electric voltage by the Wiedemann effect when the pin 15 is deformed in torsion.

The non-illustrated pick-up coil is connected in a measuring circuit with a helical potentiometer 21, an amplifier 19, and an indicating instrument 20. The control shaft 22 of the potentiometer 21 is coaxially attached to the trunnion 4 of the drum 1.

The aforedescribed apparatus operates as follows:

When the drum 1 is rotated by the drive shaft 3 to wind the cable 2 on the drum, the tension of the cable tends to deflect the drum axis in the universal joint 31. The guiding engagement between the bearing block 6 and the frame 7 permits the drum axis to be deflected in a fixed plane only, corresponding to the fixed path of the block 6 on the frame 7. The downward movement of the bearing block 6 under the applied load is resisted by the springs 8, 9, and by the torsion pin 15.

The vertical displacement of the bearing block 6 is therefore uniquely related to the torque applied by the cable 2 to the drum 1 with reference to an axis which passes through the universal joint 31 in a direction transverse to the drum axis. The signal generated by the magnetostrictive transducer is a measure of the torque.

As the cable 2 is wound on the drum 1, the torque changes while the free end of the cable moves axially toward or away from the joint 31 even though the load may remain constant. The potentiometer 21 compensates for the resulting change in the output voltage of the magnetostrictive transducer. If the free end of the cable 2 moves away from the joint 31 during clockwise movement of the drum 1, the potentiometer modifies the transducer signal to reduce the voltage at the input of the amplifier 19 when the control shaft 22 is rotated clockwise, and vice versa.

The circuit between the transducer, the potentiometer 21, the amplifier 19, and the instrument 20 has been indicated in FIG. 2 by single lines in a conventional manner. It will be understood to include at least dual conductors of which one may be a common ground connection.

The instrument 20 may be calibrated in electrical units of the amplifier output, but it may also be directly calibrated in units of weight or load corresponding to the tension in the cable 2.

The potentiometer 21 may be omitted, and the transducer may be directly connected to the input of the amplifier 19 if the cable 2 is mounted on the drum 1 in a manner different from that illustrated in FIG. 2, and conventional in itself. When both ends of the cable 2 are attached to respective axial ends of the drum 1, and the load is suspended from a central loop in the cable, the load vector remains in a fixed plane transverse to the drum axis while the two free strands of the cable move toward the drum center during winding of the cable on the drum.

The amplifier 19 is preferred in a tension measuring arrangement of the type illustrated, but not required if an indicating instrument of adequate sensitivity is employed. The latter, of course, may be replaced by a suitable conventional recording instrument if a graphic record of the tension in the cable 2 is desired.

The modified embodiment of the invention illustrated in FIG. 3 is closely similar to that shown in FIGS. 1 and 2, but employs a piezoelectric pressure-responsive transducer as the signal generating element. The trunnion 4 of the cable drum is journaled in a bearing block 6' which is vertically movable and tiltable in a fixed supporting frame 7' to which it is attached by leaf springs 8', 9'. An abutment on the lower leaf spring 9' engages the piezoelectric transducer 23 which is conventional in itself, and whose output signal may be modified to compensate for changes in torque, amplified, and indicated in a manner not significantly different from the mode of operation of the measuring circuit illustrated in FIG. 2.

While the invention has been described with particular reference to a hoist, it will be appreciated that the measuring apparatus of the invention may be employed to measure tension in elongated tension members generally. Other applications of the apparatus illustrated and described include the measurement of the load applied to the cable connecting a crane grab to a trolley hoist, and other applications will readily suggest themselves to those skilled in the art.

Where a tension member is trained over pulleys in addition to a drum, the pulleys may be suspended in one fixed bearing by a universal joint and in a bearing movably mounted in the manner of the bearing block 6, and the deflection of the block may be used to generate an electrical signal which may be combined with that derived from the drum arrangement in an obvious manner.

It will be understood, therefore, that the foregoing disclosure relates only to preferred embodiments of the invention, and that it is intended to cover all changes and modifications of the examples of the invention chosen herein for the purpose of the disclosure which do not constitute departures from the spirit and scope of the invention set forth in the appended claims.

What is claimed is:

1. An apparatus for measuring tension in a tension member comprising, in combination:
    (a) drum means adapted to have a tension member wound thereon, said drum means having an axis and two axial end portions;
    (b) drive means arranged for rotation about a fixed axis and pivotally engaging one of said end portions for rotating said drum means about the axis thereof;
    (c) bearing means for supporting the other end portion of said drum means, said bearing means including
        (1) a fixed support,
        (2) a bearing member movable on said support in a direction transverse of the axis of said drum means, said other end portion rotatably engaging said bearing member, and
        (3) yieldably resilient means urging said bearing member toward a predetermined position relative to said support; and
    (d) measuring means for measuring the spacing of said bearing member from said predetermined position.

2. An apparatus as set forth in claim 1, wherein said drive means include a shaft, a universal joint connecting said shaft to said one end portion of said drum means, and actuating means for actuating rotation of said shaft about said fixed axis.

3. An apparatus as set forth in claim 1, wherein said measuring means include signal generating means for generating an electrical signal in response to the spacing of said bearing member from said predetermined position, and indicating means for indicating the signal generated.

4. An apparatus as set forth in claim 3, further comprising signal modifying means in circuit with said signal generating means and operatively connected to said drum means for modifying said signal in response to the rotation of said drum means.

5. An apparatus as set forth in claim 3, wherein said signal generating means include a ferromagnetic torsion member mounted on said support, motion transmitting means interposed between said torsion member and said bearing member for stressing said torsion member in response to movement of said bearing member in said transverse direction, and sensing means for sensing the torsional stress in said torsion member and for issuing said signal in response to the stress sensed.

6. An apparatus as set forth in claim 3, wherein said signal generating means include a magnetostrictive transducer.

7. An apparatus as set forth in claim 3, wherein said signal generating means include a piezoelectric pressure-responsive transducer, and motion transmitting means for exerting pressure on said transducer in response to the movement of said bearing member away from said predetermined position.

8. An apparatus as set forth in claim 3, further comprising a potentiometer means in circuit with said signal generating means for modifying the signal generated, said potentiometer means including a movable control member, and motion transmitting means interposed between said control member and said drum means for moving said control member when said drum means rotates about said axis thereof.

References Cited by the Examiner
UNITED STATES PATENTS
1,168,706  1/1916  Brassington _____ 73—143
FOREIGN PATENTS
643,775  9/1950  Great Britain.

JAMES J. GILL, *Acting Primary Examiner.*

RICHARD C. QUEISSER, *Examiner.*

CHARLES A. RUEHL, *Assistant Examiner.*